Figure 1:
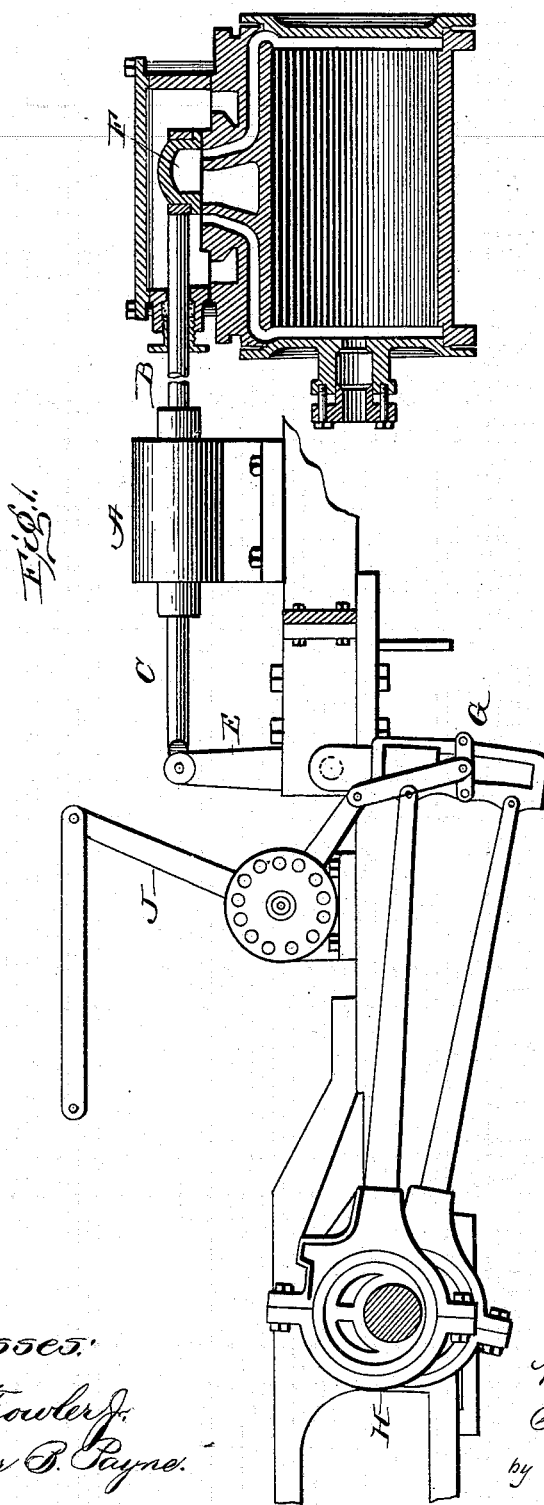

No. 612,196. Patented Oct. 11, 1898.
W. H. CUTLER & S. V. GODDEN.
VALVE GEAR FOR ENGINES.
(Application filed Dec. 15, 1897.)

(No Model.) 2 Sheets—Sheet 1.

Witnesses:
J. M. Fowler Jr.
Walter B. Payne.

Inventors:
Wm. H. Cutler &
Stephen V. Godden,
by Henry H. Bates
their Attorney

No. 612,196. Patented Oct. 11, 1898.
W. H. CUTLER & S. V. GODDEN.
VALVE GEAR FOR ENGINES.
(Application filed Dec. 15, 1897.)
(No Model.) 2 Sheets—Sheet 2.
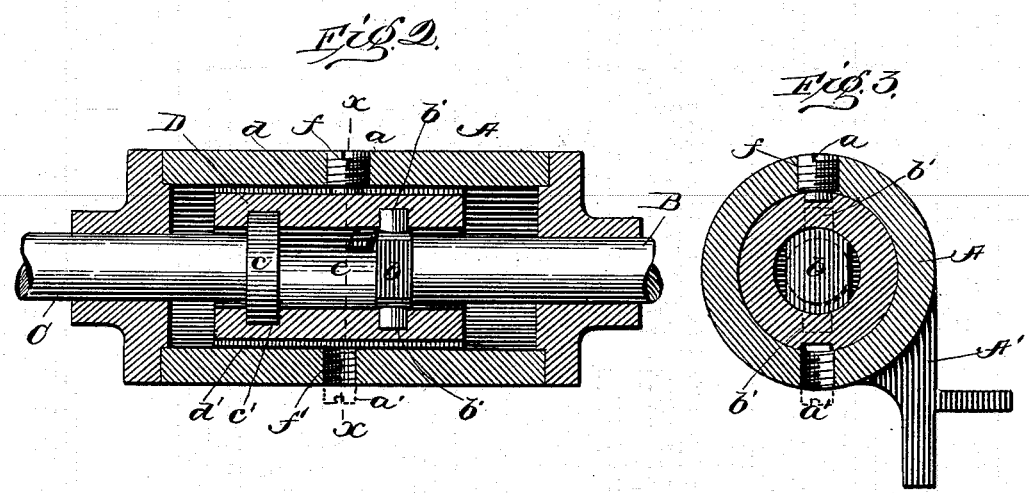
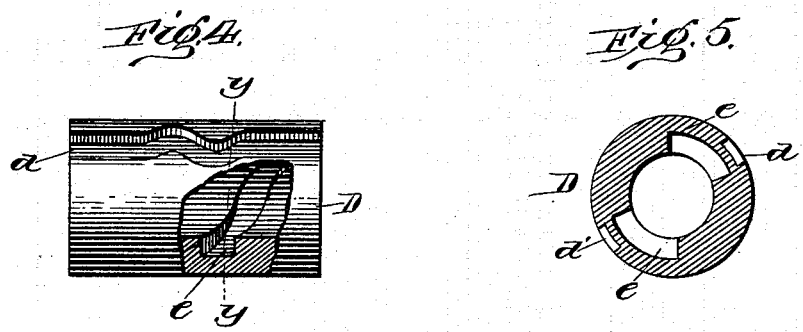
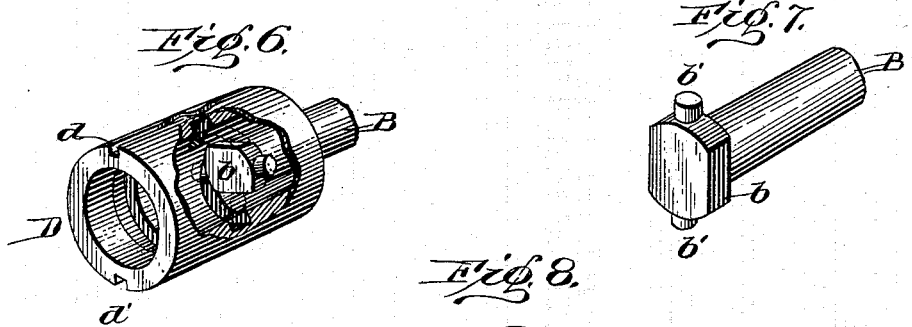
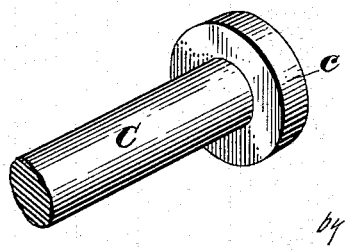
Witnesses:
J. M. Fowler Jr.
Walter P. Payne.
Inventors
Wm H Cutler &
Stephen V. Godden
by Henry H. Bates
their Attorney.
THE NORRIS PETERS CO., PHOTO-LITHO., WASHINGTON, D. C.

UNITED STATES PATENT OFFICE.

WILLIAM HILLMAN CUTLER, OF FREEPORT, NEW YORK, AND STEPHEN VERNOR GODDEN, OF BOSTON, MASSACHUSETTS.

VALVE-GEAR FOR ENGINES.

SPECIFICATION forming part of Letters Patent No. 612,196, dated October 11, 1898.

Application filed December 15, 1897. Serial No. 662,005. (No model.)

*To all whom it may concern:*

Be it known that we, WILLIAM HILLMAN CUTLER, residing at Freeport, in the county of Queens and State of New York, and STE-PHEN VERNOR GODDEN, residing at Boston, in the county of Suffolk and State of Massachusetts, citizens of the United States, have invented certain new and useful Improvements in Auxiliary Valve-Gear for Motive Engines, of which the following is a full, clear, and exact description, such as will enable others skilled in the art to which it appertains to make and use the same, reference being had to the accompanying drawings, forming a part of this specification, in which—

Figure 1 is a side view, partially in section, showing a portion of a typical engine of the reciprocating species, including the eccentric-gear and the link-motion-reversing gear, the rocking arm, and the reciprocating valve, with our improved auxiliary or intermediate gear interposed between sections of the valve-rod. Fig. 2 is a longitudinal section of our improvement, showing the stationary shell, the tubular rotary cam within the same, portions of the valve-rod and rocker-arm rod, and mode of connecting the same with the tubular rotary cam. Fig. 3 is a transverse sectional view of the same, taken on line $x\,x$, with bracket for attachment to stationary framework. Fig. 4 is a view of the tubular rotary cam, showing outer cam-groove and broken away to show also a portion of the inner cam-groove. Fig. 5 is a transverse section of the same, taken on line $y\,y$. Fig. 6 is a perspective view of the tubular rotary cam, showing exterior cam-groove and broken away to show mode of connection of valve-rod with interior cam-groove. Fig. 7 is a detail view showing the end of valve-rod and its mode of connection with the interior cam-groove. Fig. 8 is a detail view showing the end of the rocker-arm rod and its mode of connection with the interior of the tubular rotary cam.

Like letters of reference indicate like parts in the several figures.

Our invention relates to improvements in the valve-gear of motive engines operated by elastic fluids, as steam, gas, or air, particularly that class of reciprocating engines employing slide-valves operated by eccentrics on the main rotating shaft in connection with the well-known "link-motion" for reversing-gear. It is well known that this device in its original form is wasteful of steam at some points of the stroke and sparing of steam at other points, both on the supply and exhaust sides of the piston, in respect to obtaining the fullest and best effects, owing to the uniformly accelerated and retarded movements of the slide-valve under the operation of the eccentrics, which give it regular reciprocating movements similar to those of a pendulum. It is a desideratum to correct this defect by imparting to the valve such an irregular to-and-fro movement as the best conditions require for economy of steam combined with fullest expenditure thereof for maximum efficiency, and many devices have been contrived to accomplish this result. This problem we have practically solved by our present invention, which is an improvement on the device patented to Frank M. Stevens, October 22, 1895, No. 548,598, and assigned to Stephen V. Godden, one of the above-named petitioners.

Our invention consists in placing at some point in the rod or other means which ordinarily connects the reciprocating valve with the rocker-arm actuating the same and which derives its oscillating motion from the eccentrics on the main shaft an auxiliary gear of peculiar improved construction which shall so modify the equable and pendulous movements of said rocker arm and rod when imparted to the valve as to introduce the irregularities of movement above explained as necessary for the best results. This auxiliary device is in its most essential feature a tubular rotary cam, illustrated in the accompanying drawings, which we now proceed to describe.

In Fig. 1, showing the general relation of our improvement to the other connected parts of the engine, F is the valve; E, the rocker-arm; B, the valve-rod section, and C the rocker-arm-rod section.

A, Figs. 1 and 2, is a stationary tubular shell detachably or otherwise firmly fixed to some immovable part of the framework of the engine in the path of the ordinary rod connecting the rocker-arm E with the reciprocating valve governing the admission of steam to and from the cylinder. Said rod is divided into sections B and C, the former leading to the valve and the latter connected to the rocker-arm in the usual manner. Within the said shell A is fitted a tubular rotary cam D so as to move freely therein, said cam being connected to rocker-arm rod C by means of the button-head $c$ on the rod, fitting and freely rotating in the annular groove $c'$, formed on the interior surface of the said tube, near the end thereof. On the extremity of the valve-rod section B is formed a head $b$, having at diametral extremities thereof pins or projections $b'$ $b'$, which engage a cam-groove of irregular contour formed in the interior surface of the tube D, as shown in Fig. 6. The said tube D is thus so far free to rotate axially within the shell A, governed only by the relative positions of cam-groove $e$ and pins $b'$ $b'$. On the exterior of the tube D is formed a cam-groove $d$, also of irregular contour, into which when in operative position projects a pin $a$, firmly held in the perforation $f$ in the shell A by screw-thread or other suitable connections. This pin $a$, by means of the said cam-groove, governs the combined longitudinal and rotary motions of the tube D in accordance with the law of its construction as the said tube is thrust forward and backward by the impulse given to the rocker-arm rod, with which it is rotarily connected. These movements in turn govern the movements of the interior cam-groove $e$, from which the valve-rod B receives its forward and backward movements, converting the motion thereof from the equable pendulous movements of rocker-arm rod C into irregular retarded and accelerated longitudinal movements compounded of the combined longitudinal and rotary movements given to the cam by the form of the outer cam-groove $d$ and the irregular compound movements thus generated reconverted into longitudinal to-and-fro movements by the action of interior cam-groove $e$ on the head $b$ of valve-rod B, which compound movements, carefully predetermined by mechanical calculation in laying out the forms of the cam-grooves $d$ and $e$, are transmitted to the valve, so as to generate the movements required for the desired mode of admission and emission of steam or other elastic fluid to and from the cylinder. No specific rules for the laying out of these cam-grooves are here given, as the same vary with circumstances and required conditions, and the art is one of mechanical mathematics within the province of the artisan skilled in the art.

Since the pins or projections $b'$ $b'$ on the head $b$ are preferably made in duplicate, as shown, the cam-groove $e$ is also made with duplicate corresponding branches to accommodate the said projections engaging therewith. In order to introduce the head $b$, with its projections $b'$ $b'$, into engagement, the cam-groove $e$ is made with outlets at the margin of the cam-tube, suitably located so as not to interfere with the function thereof. Cam-groove $d$ may also be duplicated.

In case the whole effect should be desired to be relegated to the outer cam-groove, as may be the case when only retarding movements are contemplated, the head $b$ of valve-rod B may be formed as a circular button, rotating in an annular groove similar to groove $c'$ at the other end of tube D. These annular grooves in the cam-tube are made with screw-threaded junctures both to facilitate the introduction of the button-heads and to facilitate construction. These junctures are also arranged to compensate for wear.

In case it is desired to use the engine with a rigid valve-rod without auxiliary gear to introduce irregular movements that end may be accomplished by locking the cam-tube D against rotary movements, giving it only longitudinal linear reciprocating motion corresponding to that of the rocker-arm rod, of which it forms a connecting-link with the valve-rod. This may be done in any suitable way known to mechanics. We show one way in the rectilineal and parallel groove $d'$, formed on the cylindrical surface of the tube D, to employ which it will be necessary to remove pin $a$ from engagement with cam-groove $d$ and insert the same or a similar pin in the corresponding screw-threaded aperture $f'$, where it will prevent rotary movement of the cam-tube, while permitting free longitudinal linear motion. In ordinary use aperture $f'$ should preferably be kept closed by a stop-plug flush with the inner surface of the shell A, so as not to impede the free movements of tube D and to retain the lubricating material, for the introduction of which the necessary apertures are provided.

The extremities of pin $a$ and projections $b'$ $b'$ may be armed with antifriction-rollers or other well-known antifriction appliances when deemed desirable.

In case still more complex movements of the valve should be desired under peculiar conditions two or more of the above-described devices may be employed on the same valve-rod in series, whose conjoined and combined movements may thus be transmitted to the valve or valves; but the means and apparatus above described are sufficient for all ordinary and useful purposes.

We claim and desire to secure by Letters Patent—

1. An auxiliary gear for the valve-motions of reciprocating engines, consisting of a cam-tube having cam-grooves in its inner and outer surfaces interposed between sections of the rod or means connecting the reciprocating valve with the rocker-arm or other source of motion, whereby a useful irregularity is imparted to the movements of said valve, substantially as specified.

2. In combination with the reciprocating valve of an engine, and the rocker-arm transmitting motion thereto, a tubular rotary cam interposed between the same, in the connection thereof, said cam having an irregular cam groove or grooves in its outer surface, coöperating with a fixed controlling means, as a guide-pin, whereby the rectilinear to-and-fro movements imparted to said tubular cam by the rocker-arm rod are converted into irregular combined rotary and forward-and-back movements, which in turn are conveyed to the valve-rod and converted into irregular to-and-fro linear movements through a suitable connection, substantially as specified.

3. In combination with the reciprocating valve of an engine, and the rocker-arm transmitting motion thereto, a tubular rotary cam interposed between the same, in the connection thereof, said cam having an irregular cam groove or grooves in its outer surface, and also an irregular cam groove or grooves in its inner surface, the former coöperating with a fixed controlling means, as a guide-pin, and the latter coöperating with engaging means borne on the head of the valve-rod, whereby the rectilinear to-and-fro movements imparted to the said tubular cam are converted into irregular combined rotary and forward-and-back movements, which are transmitted to the valve-rod through the medium of the inner cam groove or grooves and its connection with the said valve-rod, and modified into compound irregular to-and-fro linear movements and thence transmitted to the valve, substantially as specified.

4. As an improvement in auxiliary gear for valve-motions, the combination of stationary shell A, valve-rod B, rocker-arm rod C, tubular rotary cam D, having cam-grooves $d$, $e$, guide-pin $a$, swivel connection $c$, and rod-head $b$ with projections $b'$ $b'$, substantially as specified.

5. A tubular cam for valve-gears, consisting of tube D having exterior cam-groove $d$ formed on its outer surface, and interior cam-groove $e$, formed in its inner surface, in combination with means for reciprocating the said cam and for transmitting the irregular motions occasioned thereby, substantially as specified.

In testimony whereof we have hereunto affixed our signatures in presence of two witnesses.

WILLIAM HILLMAN CUTLER.
STEPHEN VERNOR GODDEN.

Witnesses:
GEORGE F. TAFT,
GEO. E. TABER.